United States Patent
Baker

(10) Patent No.: US 11,960,362 B2
(45) Date of Patent: *Apr. 16, 2024

(54) SYSTEMS AND METHODS FOR CONSISTENT BACKUP OF DISTRIBUTED, TRANSACTIONAL DATABASES

(71) Applicant: Palantir Technologies Inc., Denver, CO (US)

(72) Inventor: James Baker, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,726

(22) Filed: Oct. 10, 2022

(65) Prior Publication Data

US 2023/0031243 A1 Feb. 2, 2023

Related U.S. Application Data

(63) Continuation of application No. 17/006,109, filed on Aug. 28, 2020, now Pat. No. 11,500,731.

(60) Provisional application No. 62/895,374, filed on Sep. 3, 2019.

(51) Int. Cl.
*G06F 16/00* (2019.01)
*G06F 11/14* (2006.01)
*G06F 16/215* (2019.01)
*G06F 16/23* (2019.01)
*G06F 16/27* (2019.01)

(52) U.S. Cl.
CPC ...... *G06F 11/1451* (2013.01); *G06F 11/1464* (2013.01); *G06F 16/215* (2019.01); *G06F 16/2379* (2019.01); *G06F 16/27* (2019.01); *G06F 2201/835* (2013.01)

(58) Field of Classification Search
None
See application file for complete search history.

(56) References Cited

U.S. PATENT DOCUMENTS

| | | | |
|---|---|---|---|
| 11,500,731 B2 | 11/2022 | Baker | |
| 2011/0289052 A1* | 11/2011 | Rambacher | G06F 16/2322 707/624 |
| 2018/0074919 A1* | 3/2018 | Lee | G06F 16/128 |
| 2018/0300205 A1* | 10/2018 | Sehgal | G06F 11/1451 |

(Continued)

FOREIGN PATENT DOCUMENTS

EP 2 738 697 6/2014

OTHER PUBLICATIONS

Official Communication for European Patent Application No. 20193748.9 dated Feb. 5, 2021, 8 pages.

*Primary Examiner* — Bai D Vu
(74) *Attorney, Agent, or Firm* — Knobbe, Martens, Olson & Bear, LLP

(57) ABSTRACT

A distributed, transactional database uses timestamps, such as logical clock values, for entry versioning and transaction management in the database. To write to the database, a service requests a timestamp to be inserted into the database with a new version of data. During a backup procedure, a cleanup process is paused, issuing new timestamps is paused, and a backup timestamp is generated, which results in an effective backup copy. During a restore of a backup, a snapshot of the database is loaded and any entries older than the backup timestamp are deleted, which ensures that a consistent restore has occurred.

14 Claims, 9 Drawing Sheets

(56) References Cited

U.S. PATENT DOCUMENTS

| | | | |
|---|---|---|---|
| 2019/0179711 A1* | 6/2019 | Luo ..................... | G06F 11/1464 |
| 2020/0125462 A1* | 4/2020 | Zhu ..................... | G06F 11/0751 |
| 2020/0250171 A1* | 8/2020 | Yin ..................... | G06F 16/2365 |
| 2020/0349030 A1* | 11/2020 | Meadowcroft ..... | G06F 11/1471 |

* cited by examiner

| Key | Timestamp | Value |
|-----|-----------|-------|
| K   | 5         | $V_1$ |

| Key | Timestamp | Value |
|-----|-----------|-------|
| K   | 5         | $V_1$ |
| K   | 10        | $V_2$ |

Backup Timestamp: 7

— 500A

| Key | Timestamp | Value |
|-----|-----------|-------|
| K   | 5         | V₁    |
| K   | 10        | V₂    |

Backup Timestamp: 7

— 500B

| Key | Timestamp | Value |
|-----|-----------|-------|
| K   | 5         | V₁    |

SYSTEMS AND METHODS FOR CONSISTENT BACKUP OF DISTRIBUTED, TRANSACTIONAL DATABASES

INCORPORATION BY REFERENCE TO ANY PRIORITY APPLICATIONS

This application is a continuation of U.S. patent application Ser. No. 17/006,109, filed Aug. 28, 2020, and titled "SYSTEMS AND METHODS FOR CONSISTENT BACKUP OF DISTRIBUTED, TRANSACTIONAL DATABASES," which application claims benefit of U.S. Provisional Patent Application No. 62/895,374, filed Sep. 3, 2019, and titled "SYSTEMS AND METHODS FOR CONSISTENT BACKUP OF DISTRIBUTED, TRANSACTIONAL DATABASES." The entire disclosure of each of the above-referenced applications is hereby made part of this specification is if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

BACKGROUND

Data can be stored in a database system, such as a distributed database system. A backup of the data in the database system can be generated. In a distributed database system, a single node can be backed up. The database system can be restored based on the backup of the data.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a system for backing up a distributed database is disclosed comprising: one or more non-transitory computer storage mediums configured to store one or more database clusters, the one or more database clusters comprising a plurality of nodes, wherein each node of the plurality of nodes comprises a key-value table, and wherein each entry of a respective key-value table comprises a timestamp; and one or more computer hardware processors in communication with the one or more non-transitory computer storage mediums, the one or more computer hardware processors configured to execute computer-executable instructions to at least: pause a cleanup process on the plurality of nodes; initiate a hold on issuing one or more new timestamps to one or more external computing devices; generate a backup timestamp; remove the hold on issuing one or more new timestamps to one or more external computing devices; generate a duplicate copy of data from the plurality of nodes; initiate the cleanup process on the plurality of nodes; and store the duplicate copy of data and the backup timestamp.

According to an aspect, the one or more computer hardware processors may be further configured to: receive a request to restore one or more key-value tables on the plurality of nodes; load the duplicate copy of data on a first node of the plurality of nodes; and delete a first entry from the first node with a first timestamp more recent than the backup timestamp.

According to another aspect, wherein to store the duplicate copy of data, the one or more computer hardware processors may be configured to: determine that a first portion of the duplicate copy of data changed from a previous duplicate copy of data; and store the first portion of the duplicate copy of data that changed.

According to yet another aspect, wherein to store the duplicate copy of data, the one or more computer hardware processors may be configured to: determine that a second portion of the duplicate copy of data remained unchanged from the previous duplicate copy of data; and store metadata associated with the second portion, the metadata indicating that the second portion remained unchanged.

According to yet another aspect, wherein to determine that the first portion changed, the one or more computer hardware processors may be configured to: generate a first hash value from the first portion; generate a second hash value from a portion of the previous duplicate copy of data corresponding to the first portion; and determine that the first hash value is different than the second hash value.

According to yet another aspect, the one or more computer hardware processors may be further configured to: receive a request to restore one or more key-value tables on the plurality of nodes; load the duplicate copy of data on a first node of the plurality of nodes; and delete a first entry from the first node with a first timestamp more recent than the backup timestamp.

According to yet another aspect, the first timestamp may comprise a first numerical value, the backup timestamp may comprise a second numerical value, the one or more computer hardware processors may be further configured to: determine that the first timestamp is more recent than the backup timestamp, wherein to determine that the first timestamp is more recent, the one or more computer hardware processors are configured to: determine that the first numerical value is greater than the second numerical value.

According to yet another aspect, the backup timestamp may comprise a logical clock value, and wherein to generate the backup timestamp, the one or more computer hardware processors may be further configured to: increment a current logical clock value.

According to yet another aspect, the one or more computer hardware processors may be further configured to: receive a request to insert a key-value entry into a first key-value table on the plurality of nodes; generate a new timestamp; and insert the key-value entry into the first key-value table with the new timestamp.

According to yet another aspect, the new timestamp may comprise a logical clock value, and wherein to generate the new timestamp, the one or more computer hardware processors may be further configured to: increment a current logical clock value.

According to yet another aspect, the one or more computer hardware processors may be further configured to: receive, from a first external computing device, a request for a new timestamp during the hold; and postpone responding to the request until the hold is removed.

According to yet another aspect, the duplicate copy of data may comprise a portion of data from the plurality of nodes. The portion of data may comprise data that has changed since a last backup.

According to another embodiment, a method is disclosed comprising: pausing a cleanup process on a plurality of nodes on one or more database clusters, wherein each node of the plurality of nodes comprises a key-value table, and wherein each entry of a respective key-value table comprises a timestamp; initiating a hold on allowing writes from committing to the one or more database clusters; generating a backup timestamp; removing the hold on allowing writes from committing to the one or more database clusters; generating a duplicate copy of data from the plurality of nodes; initiating the cleanup process on the plurality of nodes; and storing the duplicate copy of data and the backup timestamp, wherein the method is performed by one or more computer hardware processors.

According to an aspect, the method may further comprise: receiving a request to restore one or more key-value tables on the plurality of nodes; loading the duplicate copy of data on a first node of the plurality of nodes; and deleting a first entry from the first node with a first timestamp more recent than the backup timestamp.

According to another aspect, storing the duplicate copy of data may further comprise: determining that a first portion of the duplicate copy of data changed from a previous duplicate copy of data; and storing the first portion of the duplicate copy of data that changed.

According to yet another aspect, storing the duplicate copy of data may further comprise: determining that a second portion of the duplicate copy of data remained unchanged from the previous duplicate copy of data; and storing metadata associated with the second portion, the metadata indicating that the second portion remained unchanged.

According to yet another aspect, determining that the first portion changed may further comprise: generating a first hash value from the first portion; generating a second hash value from a portion of the previous duplicate copy of data corresponding to the first portion; and determining that the first hash value is different than the second hash value.

According to yet another aspect, the method may further comprise: receiving a request to restore one or more key-value tables on the plurality of nodes; loading the duplicate copy of data on a first node of the plurality of nodes; and deleting a first entry from the first node with a first timestamp more recent than the backup timestamp.

According to yet another aspect, the first timestamp may comprise a first numerical value, the backup timestamp may comprise a second numerical value, the method may further comprise: determining that the first timestamp is more recent than the backup timestamp, wherein determining that the first timestamp is more recent further comprises: determining that the first numerical value is greater than the second numerical value.

According to yet another aspect, the backup timestamp may comprise a logical clock value, and wherein generating the backup timestamp may further comprise incrementing a current logical clock value.

According to yet another aspect, the method may further comprise: receiving a request to insert a key-value entry into a first key-value table on the plurality of nodes; generating a new timestamp; and inserting the key-value entry into the first key-value table with the new timestamp.

According to yet another aspect, the new timestamp may comprise a logical clock value, and wherein generating the new timestamp may further comprise incrementing a current logical clock value.

According to yet another aspect, the method may further comprise: receiving, from a first external computing device, a request for a new timestamp during the hold; and postponing responding to the request until the hold is removed.

Various embodiments of the present disclosure provide improvements to various technologies and technological fields. For example, as described herein, existing distributed-database and/or backup technology (including, e.g., in-memory databases) is limited in various ways (e.g., unavailable backups; backups may contain errors; etc.), and various embodiments of the disclosure provide significant improvements over such technology. Additionally, various embodiments of the present disclosure are inextricably tied to computer technology. In particular, various embodiments rely on database schema and/or database timestamps. Such features and others (e.g., coordinating transactions in distributed databases) are intimately tied to, and enabled by, computer technology, and would not exist except for computer technology.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 3A and 3B are diagrams depicting example entries in a database, according to some embodiments of the present disclosure.

FIGS. 5A and 5B are diagrams depicting example entries in a database restore context, according to some embodiments of the present disclosure.

DETAILED DESCRIPTION

Overview

Figure 1:
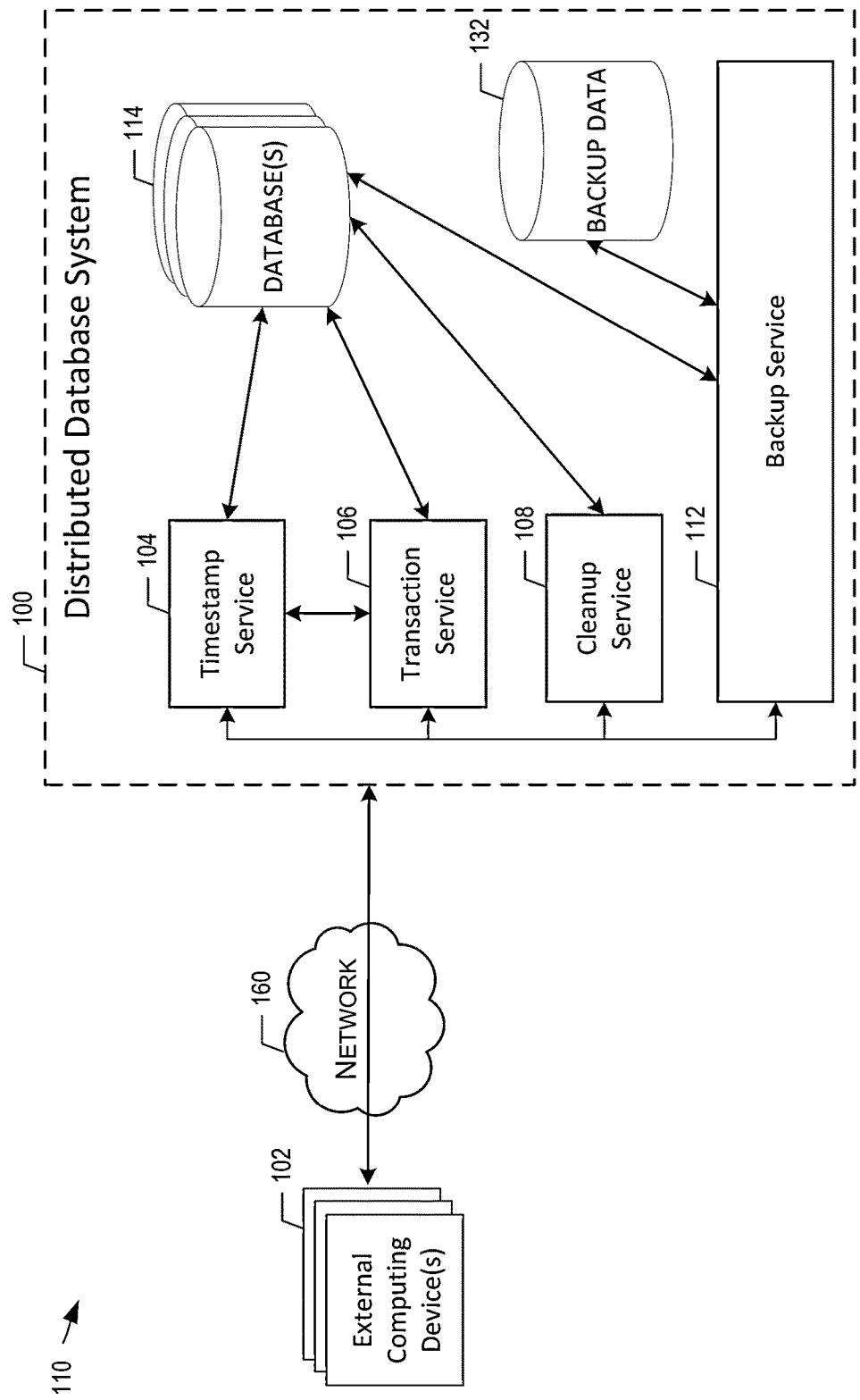
FIG. 1 is a block diagram illustrating an example distributed database system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Distributed, transactional databases can be used by services. A distributed, transactional database can guarantee Atomicity, Consistency, Isolation, and Durability (ACID) properties. Multiple services can write to and read from the distributed, transactional databases, such as a key-value database. For example, an authorization service can handle user log-ins and can store state of who is logged in using a distributed, transactional database. Another example service can be responsible for Uniform Resource Locator (URL) shortenings and can store shortened URL mappings in a distributed, transactional database. It would be advantageous if the data in the distributed, transactional database can be backed up. However, some existing distributed databases do not provide backup capabilities across multiple clusters and/or nodes. For example, a snapshot can be taken of a single node, but a snapshot of multiple nodes may not have built-in support by some distributed database frameworks.

Many existing databases use timestamps, such as, but not limited to a logic clock or a counter. The database can increment the timestamp to indicate different data versions. A writer writes at a timestamp, and a reader reads at a timestamp. The reader can see all data written before that timestamp and no data afterwards. An existing distributed, transactional database can use timestamps, such as logical clock values, for entry versioning and transaction management in the database. To write to the database, a service can request a timestamp to be inserted into the database with a new version of data. The existing distributed, transactional database can have a backup procedure. As part of the existing backup procedure, at the time of a backup, a lock can be acquired for a database and a timestamp can be determined. The database can then be backed up. The existing backup procedure can also include pausing data cleanup of the databases, grabbing backup timestamps for every service and/or database, and then backing up the data according to the backup timestamps. A technical issue that can arise is that new timestamps can be issued (e.g., for writes into a database) while the backup timestamps are being acquired, which can result in inconsistent data when the databases are restored. Example inconsistencies in the restored database can include writes that happened in the wrong order. For example, assume there is a backup around the following operations: a first operation that writes data into a first service's database, and then after the first operation there is a second operation that writes the same data into a second service's database. Upon a restore, one would expect that either the data is in the first service's database or the data is in both the first and second services' respective databases. However, under the existing backup procedure and after a restore, it is possible that there is an inconsistency where the data is in the second service's database and not the first service's database, despite the previous order of the first and second operations.

Disclosed herein are systems and methods that may be used to advantageously provide consistent backups of distributed, transactional databases. The one or more distributed, transactional databases can have a cleanup process that runs in the background and determines when old versions of data can never be read by any transaction and deletes those old versions. A consistent backup of the databases can be generated based on some of the following steps: pausing the cleanup process, pausing issuing new timestamps, taking backup timestamp(s), unpausing the timestamp issuance hold, generating duplicate copies of one or more databases, unpausing the cleanup process, and uploading the copies or portions of the copies. Backups of the databases occur in the background. When a restore of a backup is requested a snapshot of the database is loaded and any entries older than the backup timestamp are deleted, which ensures that a consistent restore has occurred. Uploads of backup copies can be expedited by only uploading incremental changes and keeping track of data that is associated with multiple backup copy versions.

As described above, existing databases work via a logical clock, a counter, or timestamp, that increments to indicate different data versions. A writer writes at a timestamp, and a reader reads at a timestamp, which means the reader can see all data written before that timestamp and no data afterwards. Accordingly, as described herein, in order to support overwrites of data, each piece of data has a key, and the reader sees only the data for each key that was written at the latest timestamp. Where there is a key with multiple values written at different timestamps "a" and "b" where "a"<"b," a cleanup task can delete the value written at "a" provided that there are no readers reading at a timestamp "t" where "t"<"b" and "t">"a." A backup can be taken by taking a backup timestamp "b" at the start of a backup, and pausing cleanup of any values overwritten at any timestamp>"b." Then, each node in the distributed database can be backed up, and on restore all data written at a timestamp>"b" can be deleted in order to achieve a consistent snapshot.

The systems and methods described herein may improve computer technology and/or may be intrinsically tied to database and/or backup technologies. For example, some existing distributed databases do not provide backup capabilities. As another example, instead of or in addition to existing approaches to backup data in distributed databases, the solutions described herein can reliably provide more consistent backups after restores. Unlike some existing solutions, the database systems and methods described herein can pause the cleanup process and can pause issuing new timestamps. Thus, the systems and methods described herein can provide more reliable restores from backups than existing solutions that can have inconsistencies, such as data errors after a restoration. With the improved database restoration solutions described herein, distributed databases can be more reliably backed up and restored. Moreover, the improved database restoration solutions described herein can run in the background and can provide minimal to no interference on the services using the databases.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A database can be distributed, transactional, and/or serializable. An example database can include Postgres®. Another example database can include Apache Cassandra®, a distributed, NoSQL database management system. Yet another example database can include Redis®, a distributed, in-memory key-value database.

Logical Clock: Refers to a mechanism for capturing chronological and/or causal relationships in a distributed system. Distributed systems may not have a synchronous global clock. Accordingly, a logical clock can allow ordering of events from different processes. A "logical clock value" can be a data value, such as a numerical value, that allows an order to be determined between first and second data values. For example, assume that first and second logical clock values are first and second numerical values, respectively; if a first numerical value is greater than a second numerical value, then the first logical clock value can be more recent than the second logical clock value. Conversely, if a first numerical value is less than a second numerical value, then the first logical clock value f can be older than the second logical clock value.

Timestamp: Any electronic representation of the time of occurrence of a particular event. An example timestamp can include a logical clock value.

Example Distributed Database System

FIG. 1 illustrates a distributed database system 100, according to some embodiments of the present disclosure. In the embodiments of FIG. 1, the computing environment 110 includes a network 160, a distributed database system 100, and an external computing device 102. The distributed database system 100 may include a timestamp service 104, a transaction service 106, a cleanup service 108, a backup service 112, one or more databases 114, and a backup data store 132. The constituents of the computing environment 110 may be in communication with each other either locally or over the network 106.

The external computing device 102 may be any computing device capable of communicating over the network 106 and requesting a database entry, writing or updating a database entry, and/or executing a database transaction. For example, an external service can be implemented on the external computing device 102 and the external service can read and/or write database entries.

Various communications between these devices are illustrated. For example, the external computing device 102 may send a request to the distributed database system 100 and the distributed database system 100 may send a response to the external computing device 102. The external computing device 102 may request a timestamp and the timestamp service 104 may respond to the external computing device 102 with a timestamp. The external computing device 102 may request a database entry and the transaction service 106 may respond to the external computing device 102 with the database entry from the one or more databases 114. The external computing device 102 may write or update a database entry and the transaction service 106 may confirm that the entry has been written or updated to the one or more databases 114. The cleanup service 108 may periodically remove entries from the one or more databases 114. The backup service 112 may generate duplicate data from the one or more databases 114 and may save the duplicate copies or some portion thereof in the backup data store 132. Other communications between these devices are described in further detail below.

The distributed database system 100 can be used in the context of a data management system. Additional details and embodiments regarding the distributed database system 100 in conjunction with a data management system are described in further detail below with respect to FIG. 8.

Figure 2A:
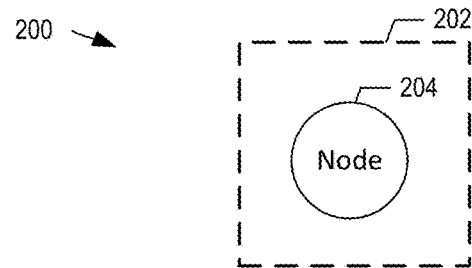
FIGS. 2A, 2B, and 2C are block diagrams depicting example database environments, according to some embodiments of the present disclosure.
Figure 2B:
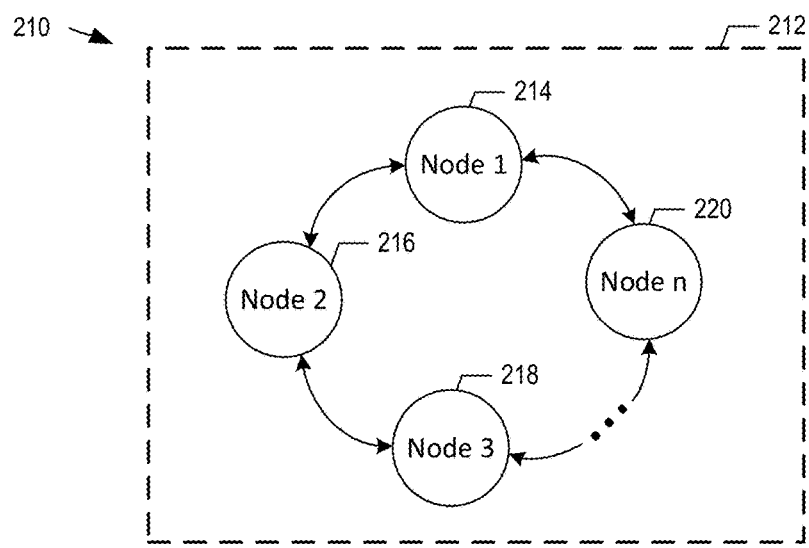
Figure 2C:
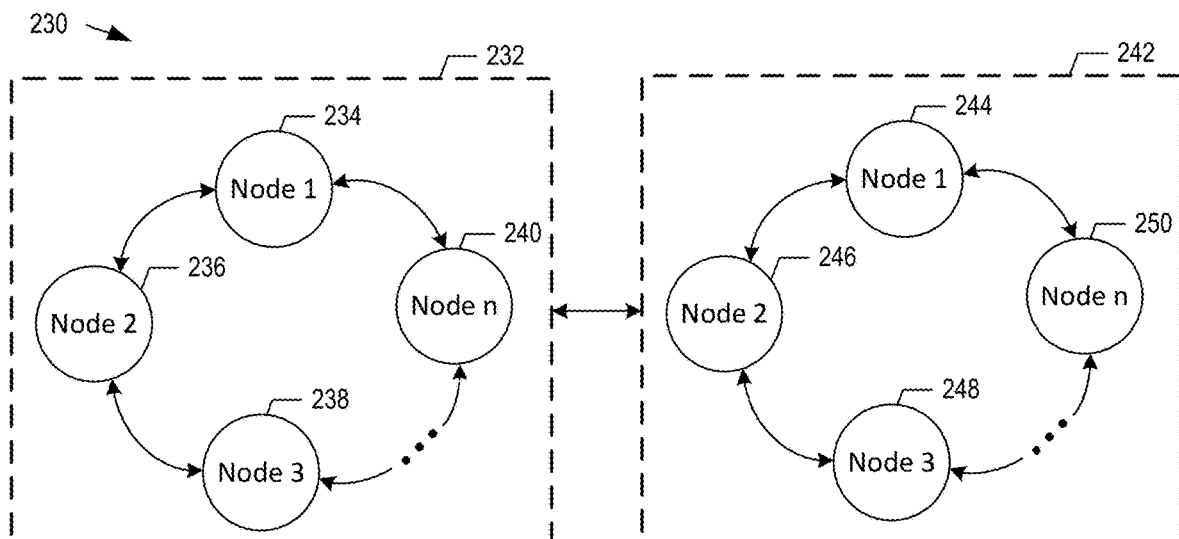

In FIGS. 2A, 2B, and 2C, various example database environments 200, 210, 230 are shown, according to some embodiments of the present disclosure. The database environments 200, 210, 230 can be implemented with a distributed database management system, such as, but not limited to, Apache Cassandra. Alternative distributed-database architectures, in addition to or in place of what is shown in FIGS. 2A, 2B, and 2C, can be used with the methods and systems disclosed herein. Each node in the database environments 200, 210, 230 can include a database (or a portion of a database) such as a key-value database. The database environments 200, 210, 230 can implement the one or more databases 114 described above with respect to FIG. 1.

Turning to FIG. 2A, the first database environment 200 can include a cluster 202 with a single node 204. Turning to FIG. 2B, the second database environment 210 can include a cluster 212 with multiple nodes 214, 216, 218, 220. In the multiple nodes 214, 216, 218, 220, data can be replicated across the nodes for redundancy. There can be horizontal partitions of data in the multiple nodes 214, 216, 218, 220. Turning to FIG. 2C, the third database environment 230 can include a first cluster 232 with multiple nodes 234, 236, 238, 240 and a second cluster 242 with multiple nodes 244, 246, 248, 250. Each of the clusters 232, 242 can be similar to the cluster 212 of FIG. 2B. Additionally, data can be replicated from the first cluster 232 to the second cluster 242. While not shown in FIG. 2C, data can be replicated across additional clusters.

Example Database Entries

FIGS. 3A and 3B are diagrams depicting example entries in a database, according to some embodiments of the present disclosure. As described herein, the database can be a key-value database with transactional properties. For example, a client of the database can start a transaction, do some read(s), and/or do some write(s), etc. Turning to FIG. 3A, a table 300A from a key-value database is depicted at a first time. As shown, the example table 300A can include a key column, a timestamp column, and a value column. While not depicted, the table 300A can include additional columns. In FIG. 3A, a transaction that starts at timestamp 5 that writes key K and value $V_1$ may write the first database entry 302. Turning to FIG. 3B, the table 300B from the key-value database is depicted at a second time. In particular, the value for K may be updated to value $V_2$ at timestamp 10, which can be reflected in the second database entry 304.

In some embodiments, the distributed database system 100 can use timestamps for cleanup purposes. For example, the distributed database system 100 can have the concept of a timestamp marker. The timestamp marker can refer to the time before the oldest currently executing transaction. In the context of the table 300B of FIG. 3B, if the timestamp marker is at timestamp 7, then the first database entry 302 cannot be cleaned up because the transaction at timestamp 7 has to have a version of K available to read that existed at that time (i.e., the first database entry 302 at timestamp 5). Conversely, if the timestamp marker is 10 that means the oldest currently executing transaction can be greater than 10, then the first database entry 302 can be cleaned up, such as by being removed, because there is not a currently pending transaction that could ever read the first database entry 302 (which is at timestamp 5) because there is already second database entry at timestamp 10.

Example Backup Processes

Figure 4:
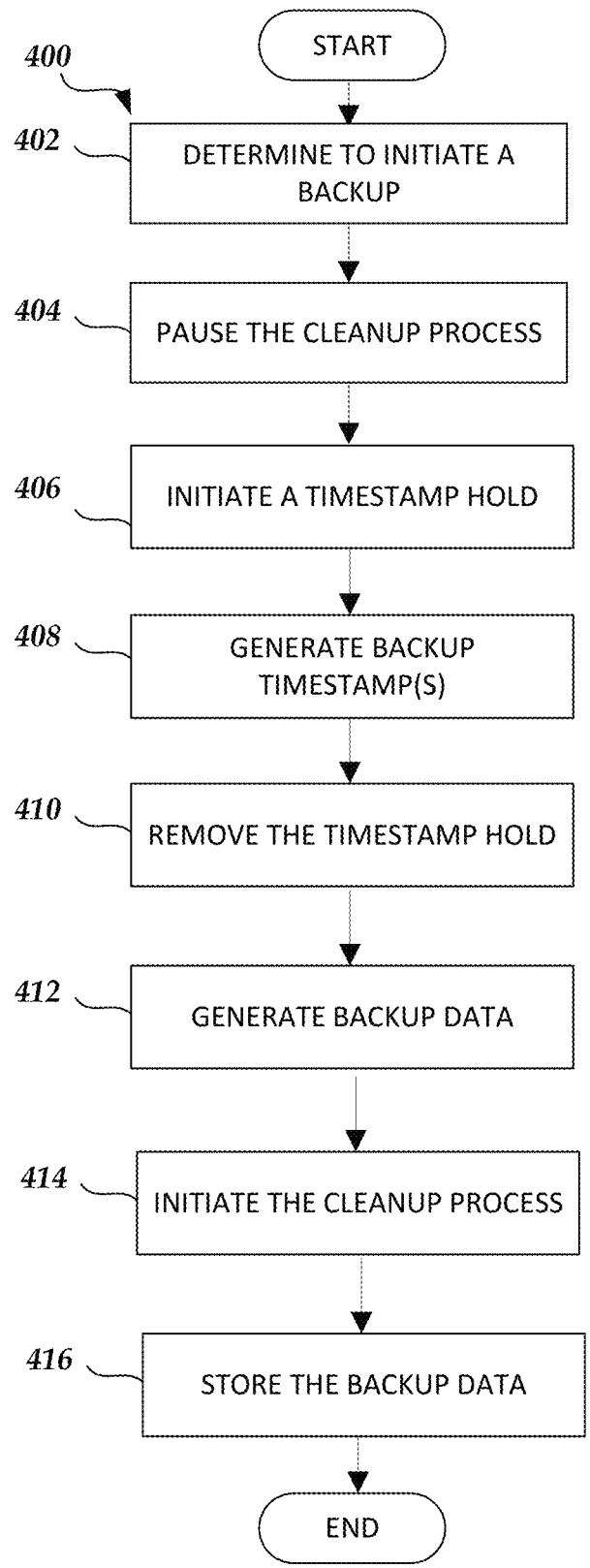
FIG. 4 is a flowchart illustrating an example method of backing up data, according to some embodiments of the present disclosure.

FIG. 4 is a flowchart illustrating an example method 400 of backing up data, according to some embodiments of the present disclosure. Although the method 400 is described in conjunction with the systems of FIG. 1, any system configured to perform the method, in any order, is within the scope of this disclosure. The method 400 may be performed by the various components of the distributed database system 100 of FIG. 1 as discussed herein, including the backup service 112, the cleanup service 108, the transaction service 106, the timestamp service 104. Depending on the embodiment, the method 400 may include fewer or additional blocks and/or the blocks may be performed in an order different than is illustrated. The method 400 may be combined with any other method described herein. The method 400 can include the steps of pausing the cleanup process, pausing issuing new timestamps, and/or taking backup timestamp(s), which can result in being able to take effective snapshots of the database 114 that can be used for restoration purposes. Such steps can approximate turning off all of the database servers and backing up the servers due to the external devices and services being unable to write new data for a period of time and having the cleanup turned off for a period of time.

Beginning at block 402, it can be determined to initiate a backup. For example, the backup service 112 can determine to initiate a backup of the one or more databases 114. In some embodiments, a backup can be scheduled. The backup service 112 can access a backup schedule to determine when a backup should be initiated. Additionally or alternatively, a backup can be manually initiated by an administrator. The backup service 112 can receive a message to begin, such as a message generated by the administrator, or the backup service 112 can be executed by the administrator.

At block 404, a cleanup process can be paused. For example, the cleanup service 108 can be paused by the backup service 112. As described herein, the cleanup service 108 can periodically clean up (such as by removing) database entries that can no longer be read by any transaction. In some embodiments, the cleanup service 108 can be paused by preventing a timestamp marker from advancing. If the timestamp marker does not advance, then older database entries will not be cleaned up. Additional details regarding the timestamp marker are described above with respect to FIG. 3B. Pausing the cleanup process can be an aspect of generating a consistent backup that can be used for a restore.

At block 406, a timestamp hold can be initiated. For example, the timestamp service 104 can initiate a hold on issuing one or more new timestamps to one or more external computing devices. As described above, an example timestamp can include a logical clock value, such as a numerical value (e.g., "1212920"). A logical clock can be an n-bit counter. Pausing issuing timestamps will prevent external devices and/or services from writing new or updated database entries, which can enable creating a consistent backup snapshot of the one or more databases 114. In some embodiments, the timestamp hold can be a period of time, such as 50 milliseconds, in which a requesting device or service will not receive a timestamp for the period of time (such as multiple or all requesting devices or services). For example, the timestamp service 104 can receive a request for a new timestamp during the hold, but the timestamp service 104 can postpone responding to the request until the hold is removed. In some embodiments, each table or grouping of tables in the one or more databases 114 may have its own timestamp. Where there are multiple timestamps during the timestamp hold, again, no new timestamps may be issued. Additionally or alternatively, the database system 100 can initiate a hold on allowing writes from committing to one or more databases 114. For example, one or more databases 114 can include a Postgres database. The hold can prevent a requesting device 102 from writing commits to the database 114.

At block 408, one or more backup timestamps can be generated. For example, the backup service 112 can request a backup timestamp from the timestamp service 104. A backup timestamp can be a timestamp that is used for backup purposes. In the case of a timestamp that is a logical clock value, the timestamp service 104 can generate a backup timestamp by incrementing a current logical clock value and providing the incremented value to the backup service 112. For example, if the current logical clock value is 100, an incremented value from the current logical clock value can be 101. As described herein, in some embodiments, if each table or a group of tables has its own timestamp, multiple backup timestamps can be generated for each table or group of tables. In some embodiments, generating a backup timestamp can include retrieving a current timestamp. The backup timestamp can be used during a backup restore as described herein. Since the backup timestamp is generated during a timestamp hold, the backup timestamp can have a level of authoritativeness for backup and restore purposes.

At block 410, the timestamp hold can be removed. For example, the timestamp service 104 can remove the timestamp hold on issuing one or more new timestamps to one or more external computing devices or services. With the timestamp hold removed, external devices or services can write new or updated entries to the one or more databases 114. As described herein, the timestamp hold may be for a period of time (such as 50 milliseconds), which can be configured to be a minimal period of time to minimize the effect on external devices or services using the one or more databases 114. Thus, from the perspective of the external devices or services, backups can occur seamlessly and with minimal to negligible interruption of the external devices or services' normal use of the one or more databases 114.

In some embodiments, after the timestamp hold has been removed, external devices or services can write entries to the one or more databases 114. For example, the transaction service 106 can receive a request to insert a key-value entry into a key-value table on a node of a database cluster. The timestamp service 104 can generate a new timestamp. The transaction service 106 can insert the key-value entry into the key-value table with the new timestamp. Additional details regarding inserting entries into a table are described above with respect to FIGS. 3A and 3B. As described herein, where timestamps are logical clock values, generating a new timestamp can include incrementing a current logical clock value. Additionally or alternatively, the database system 100 can remove the hold on allowing writes from committing to one or more databases 114. Thus, by removing the hold, a requesting device 102 can be allowed to write commits to the database.

At block 412, backup data can be generated. For example, the backup service 112 can generate a duplicate copy of data from the one or more nodes of the one or more database clusters. In some embodiments, the duplicate copy can include all of the entries and metadata from each node. Additionally or alternatively, a duplicate copy of data can include a portion of data from one or more nodes. For example, the portion of data may can include data that has changed since a last backup, as opposed to a full copy of backup data. Additional details regarding efficient backup data generation and storage are described in further detail below with respect to FIG. 7.

At block 414, the cleanup process can be initiated. For example, the cleanup service 108 can be instructed to begin cleaning up database entries again. Cleanup of database entries can occur because the backup data was already generated at the previous block 412. Additional details regarding cleanup of database entries are described above with respect to FIGS. 3A and 3B.

At block 416, the backup data can be stored. For example, the backup service 112 can store the duplicate copy of data and the backup timestamp. The duplicate copy of data and the backup timestamp can be stored in the backup data store 132. Additional details regarding restoring from the backup data are described in further detail below with respect to FIGS. 5A, 5B, and 6. Additional details regarding efficient backup data generation and storage are described in further detail below with respect to FIG. 7.

Example Database Restore

FIGS. 5A and 5B are diagrams depicting example entries in a database restore context, according to some embodiments of the present disclosure. The tables of FIGS. 5A and 5B can be similar to the tables of FIGS. 3A and 3B described above. Turning to FIG. 5A, a table 500A is depicted at a first time with a first entry 502 and a second entry 504. The table 500A may have been restored from a backup copy of data. The backup restore for the table 500A can have a corresponding backup timestamp of 7. Since the second entry 504 has a timestamp of value 10, the backup service 112 can remove the second entry 504 because the second entry can be older than the backup timestamp value of 7. Accordingly, turning to FIG. 5B, the table 500B is depicted at a second time with the first entry 502 and with the second entry 504 removed. The table 500B at the second time can be fully restored and can have consistent data.

Figure 6:
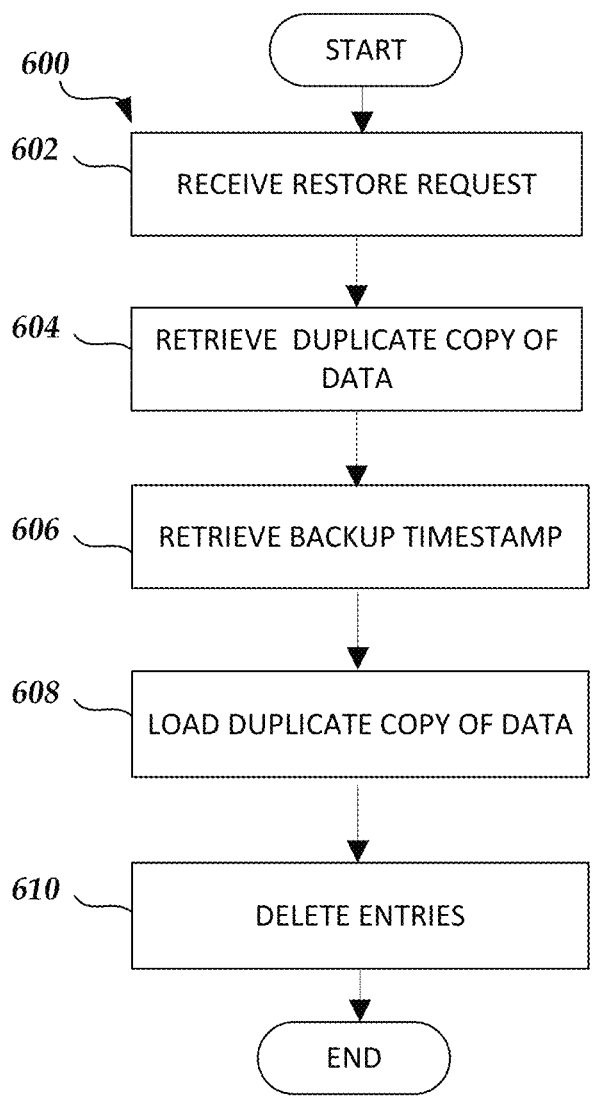
FIG. 6 is a flowchart illustrating an example method of restoring from a backup, according to some embodiments of the present disclosure.

FIG. 6 is a flowchart illustrating an example method 600 of restoring data, according to some embodiments of the present disclosure. Although the method 600 is described in conjunction with the systems of FIG. 1, any system configured to perform the method, in any order, is within the scope of this disclosure. The method 600 may be performed by the various components of the distributed database system 100 of FIG. 1 as discussed herein, including the backup service 112. Depending on the embodiment, the method 600 may include fewer or additional blocks and/or the blocks may be performed in an order different than is illustrated. The method 600 may be combined with any other method described herein.

Beginning at block 602, a restore request can be received. For example, the backup service 112 can receive a restore request. The restore request can include metadata (such as a date or time) that indicates a particular backup for a database or table (such as a key-value table on a node of a database cluster) that should be used for the restore procedure. In some embodiments, the restore request can be generated by a database administrator.

At block 604, the duplicate copy of data can be retrieved. For example, the backup service 112 can retrieve the duplicate copy of data stored on the backup data store 132. The duplicate copy of data may have been generated by the block 412 of FIG. 4 described above for generating backup data. As described herein, the duplicate copy of data can initially include some inconsistent entries that may be cleaned up in later block(s) of this method 600.

At block 606, the backup timestamp can be retrieved. For example, the backup service 112 can retrieve the backup timestamp stored on the backup data store 132. The backup timestamp may have been generated by the block 408 of FIG. 4 described above for generating backup timestamps. As described herein, the backup timestamp can be used to make the restored table or database be a consistent snapshot.

At block 608, the duplicate copy of data can be loaded. For example, the backup service 112 can load the duplicate copy of data stored onto a particular node of the database 114. As described herein, the duplicate copy of data can initially include some inconsistent entries that are loaded onto the node. The inconsistent entries can be corrected as described below. In some embodiments, such as where the database system 100 can hold allowing writes from committing to one or more databases 114, the database system 100 can have each transaction read a value, and the database system 100 can lock and change that value from the duplicate copy of data.

At block 610, entries can be deleted. For example, the backup service 112 can delete one or more entries on a particular node. As described herein, any database entries with a timestamp more recent than the backup timestamp may be deleted. Where the timestamps are logical clock values, an example database entry can have a timestamp (such as 10) that is more recent than the backup timestamp (such as 7). The example database entry can therefore be removed from the node by the backup service 112. Specifically, the backup service 112 can determine that a first timestamp is more recent than the backup timestamp where a first numerical value for the first timestamp is greater than a second numerical value for the backup timestamp. Additional details regarding removing entries are described above with respect to FIGS. 5A and 5B. After the inconsistent entries are removed from the table and/or node, the table and/or node can be a consistent snapshot of the database as of the time of the backup.

Example Efficient Backup Storage

An existing distributed, transactional database can have a backup procedure that backs up all the data in the database. In some embodiments, the backup can be very large, such as 15 or 50 terabytes of data. Backing up such a large database can be slow and take up a significant amount of storage space. Disclosed herein are systems and methods that may be used to advantageously provide incremental backups of distributed, transactional databases. An Apache Cassandra database and other distributed database systems may have large files that do not change after they created. Storing multiple copies of the same file that has not changed may be inefficient. Thus, incremental backups can be faster than existing backups and/or can use less storage space. Accordingly, the systems and methods described herein may improve computer technology and/or may be intrinsically tied to database and/or backup technologies.

Figure 7:
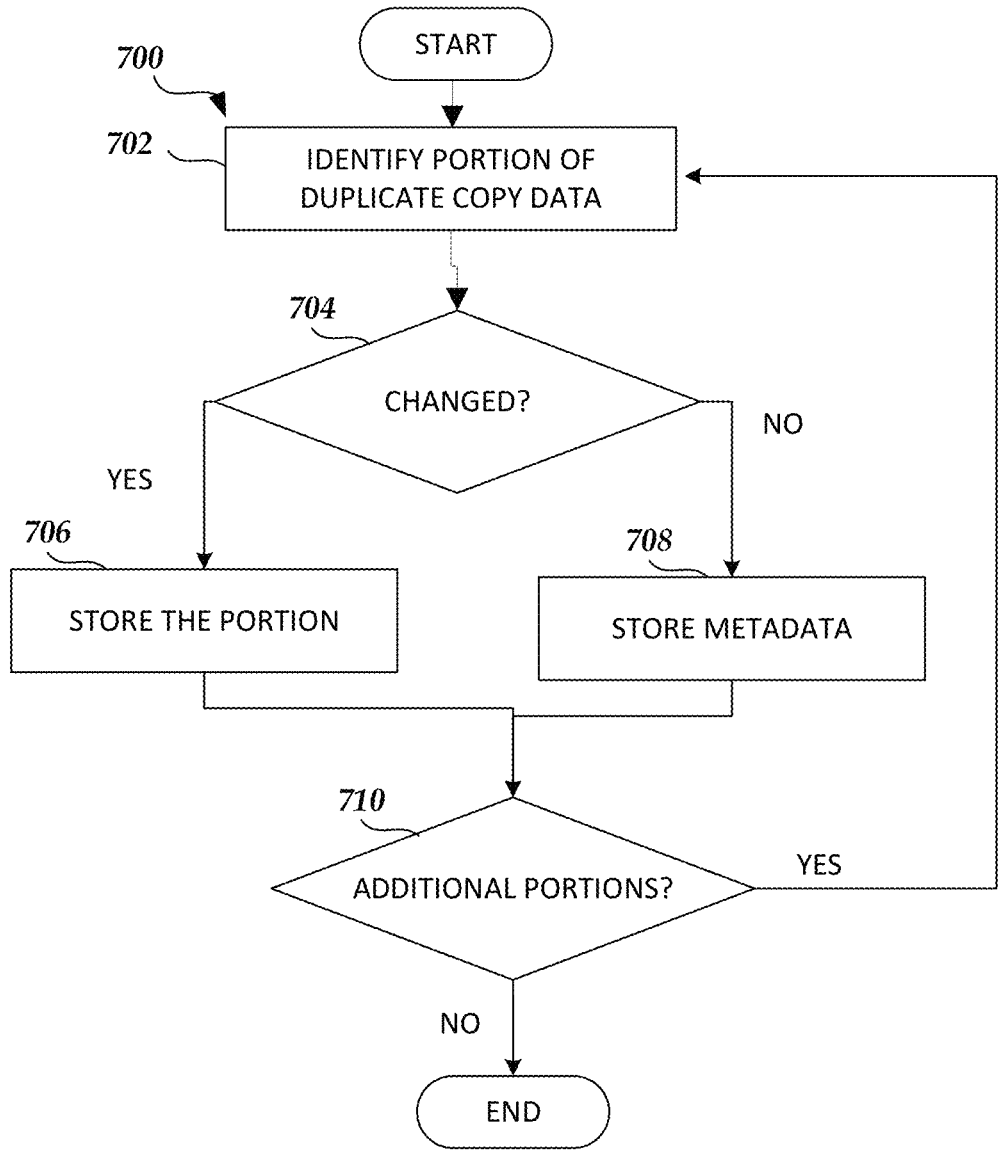
FIG. 7 is a flowchart illustrating an example method of incrementally storing backup data, according to some embodiments of the present disclosure.

FIG. 7 is a flowchart illustrating an example method 700 of incrementally storing backup data, according to some embodiments of the present disclosure. Although the method 700 is described in conjunction with the systems of FIG. 1, any system configured to perform the method, in any order, is within the scope of this disclosure. The method 700 may be performed by the various components of the distributed database system 100 of FIG. 1 as discussed herein, including the backup service 112. Depending on the embodiment, the method 700 may include fewer or additional blocks and/or the blocks may be performed in an order different than is illustrated. The method 700 may be combined with any other method described herein.

Beginning at block 702, a portion of the duplicate copy of data can be identified. For example, the backup service 112 can identify a portion of the duplicate copy of data. The duplicate copy of data can be the data from block 412 of FIG. 4 for generating backup data. The portion can be a database file. If the database is an Apache Cassandra database, the portion can be a file of the Cassandra database.

At block 704, it can be determined whether the portion of data has changed. For example, the backup service 112 can determine that a first portion of the duplicate copy of data changed from a previous duplicate copy of data. The backup service 112 can compare a portion of the duplicate copy with a corresponding portion of a previous duplicate copy. For example, the backup service 112 can generate one or more hash values from the first portion (the new portion) and one or more hash values from a portion of the previous duplicate copy of data corresponding to the first portion (the old portion). If the portion is a file, the backup service 112 can hash the first kilobyte and the last kilobyte of the file and/or some other parts of the file. If the hash values (of the comparable portions) are different, then the backup service 112 determines that the first portion of the duplicate copy of data changed from the previous duplicate copy of data.

Conversely, the backup service 112 can determine that a portion of the duplicate copy of data remained unchanged from the previous duplicate copy of data. For example, if the first hash value and the second hash value are the same, then the backup service 112 can determine that the portion remained unchanged from a previous backup. As described herein, some distributed, database systems have many files that remain unchanged for significant periods of time.

If the portion of data has changed, the method proceeds to block 706. At block 706, the portion can be stored. For example, the backup service 112 can upload the portion to the backup data storage 132 because the data has changed. If the portion of data has remained unchanged from a previous backup, the method proceeds to block 708. At block 708, metadata can be stored. For example, the backup service 112 can store metadata associated with the portion, the metadata indicating that the portion remained unchanged. In other words, instead of uploading unchanged data, metadata can be stored that tracks that the same portion of data is used for multiple backups, thereby reducing processing time for backups and reducing storage requirements for backups. The metadata can thus indicate that a same portion of backup data is associated with multiple discrete backups. Also, when no current backups reference backup data in the backup data storage 132, the portions (such as files) in the backup data storage 132 can be deleted, thereby freeing up storage space.

At block 710, if there are additional portions the method 700 returns to block 702 to repeat the method and process an additional portion. If there aren't additional portions, then storage for that duplicate copy of data can be complete.

Example Data Management Context

Figure 8:
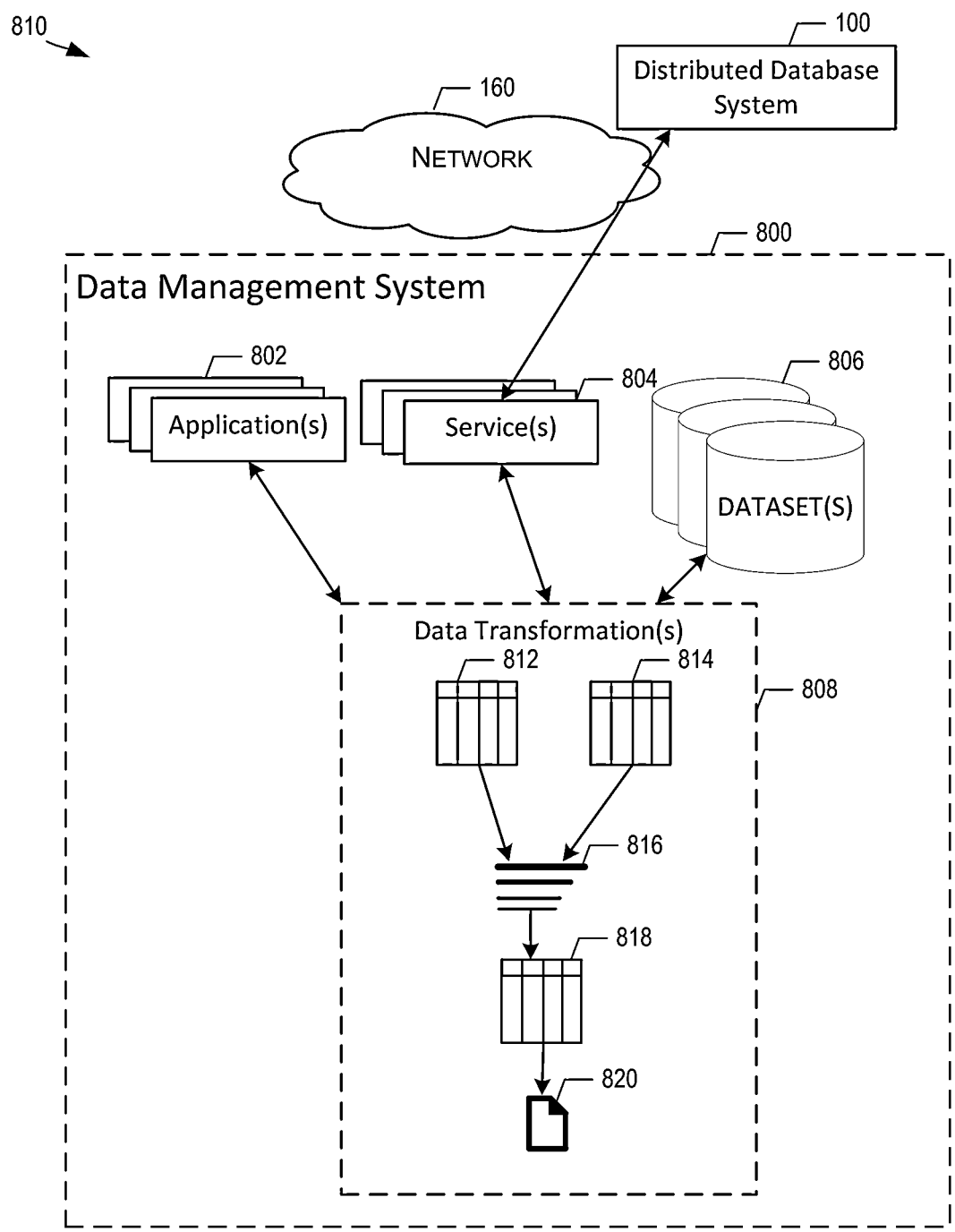
FIG. 8 is a block diagram illustrating an example distributed database system in a data management context, according to some embodiments of the present disclosure.

FIG. 8 illustrates a distributed database system 100 in a data management context, according to some embodiments of the present disclosure. In the embodiment of FIG. 8, the computing environment 810 can be similar to the computing environment 110 of FIG. 1. For example, the computing environment 810 can include a network 160 and a distributed database system 100, each of which may be similar to respective devices and systems in the computing environment 110 of FIG. 1. However, the computing environment 810 can also include a data management system 800. In particular, the services 804 of the data management system 800 can use the distributed database system 100 to store data, such as key-value data in a distributed key-value database.

The example data management system 800 includes one or more applications 802, one or more services 804, one or more initial datasets 806, and a data transformation process 808 (also referred to herein as a build process). The data management system 800 can transform data and record the data transformations. The one or more applications 802 can include applications that enable users to view datasets, interact with datasets, filter data sets, and/or configure dataset transformation processes or builds. The one or more services 804 can include services that can trigger the data transformation builds and API services for receiving and transmitting data. The one or more initial datasets 806 can be automatically retrieved from external sources and/or can be manually imported by a user. The one or more initial datasets 806 can be in many different formats such as a tabular data format (SQL, delimited, or a spreadsheet data format), a data log format (such as network logs), or time series data (such as sensor data).

The data management system 800, via the one or more services 804, can apply the data transformation process 808. An example data transformation process 808 is shown. The data management system 800 can receive one or more initial datasets 812, 814. The data management system 800 can apply a transformation to the dataset(s). For example, the data management system 800 can apply a first transformation 816 to the initial datasets 812, 814, which can include joining the initial datasets 812, 814 (such as or similar to a SQL JOIN), and/or a filtering of the initial datasets 812, 814. The output of the first transformation 816 can include a modified dataset 818. A second transformation of the modified dataset 818 can result in an output dataset 820, such as a report. Each of the steps in the example data transformation process 808 can be recorded by the data management system 800 and made available as a resource to the distributed database system 100. For example, a resource can include a dataset and/or a dataset item, a transformation, or any other step in a data transformation process. As mentioned above, the data transformation process or build 808 can be triggered by the data management system 800, where example triggers can include nightly build processes, detected events, or manual triggers by a user. Additional aspects of data transformations and the data management system 800 are described in further detail below.

The techniques for recording and transforming data in the data management system 800 may include maintaining an immutable history of data recording and transformation actions such as uploading a new dataset version to the system 800 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 800 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 800 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data management. To support branching, the catalog may store information represents a graph of dependencies as opposed to a linear dependency sequence.

The data management system 800 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 800 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Implementation Mechanisms

The various computing device(s) discussed herein, such as the distributed database system 100, the data management system 800, the timestamp service 104, the transaction service 106, the cleanup service 108, and/or the backup service 112, and/or the external computing device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The distributed database system 100 may be hosted and/or executed on one or more computing devices with one or more hardware processors and with any of the previously mentioned operating system software.

Figure 9:
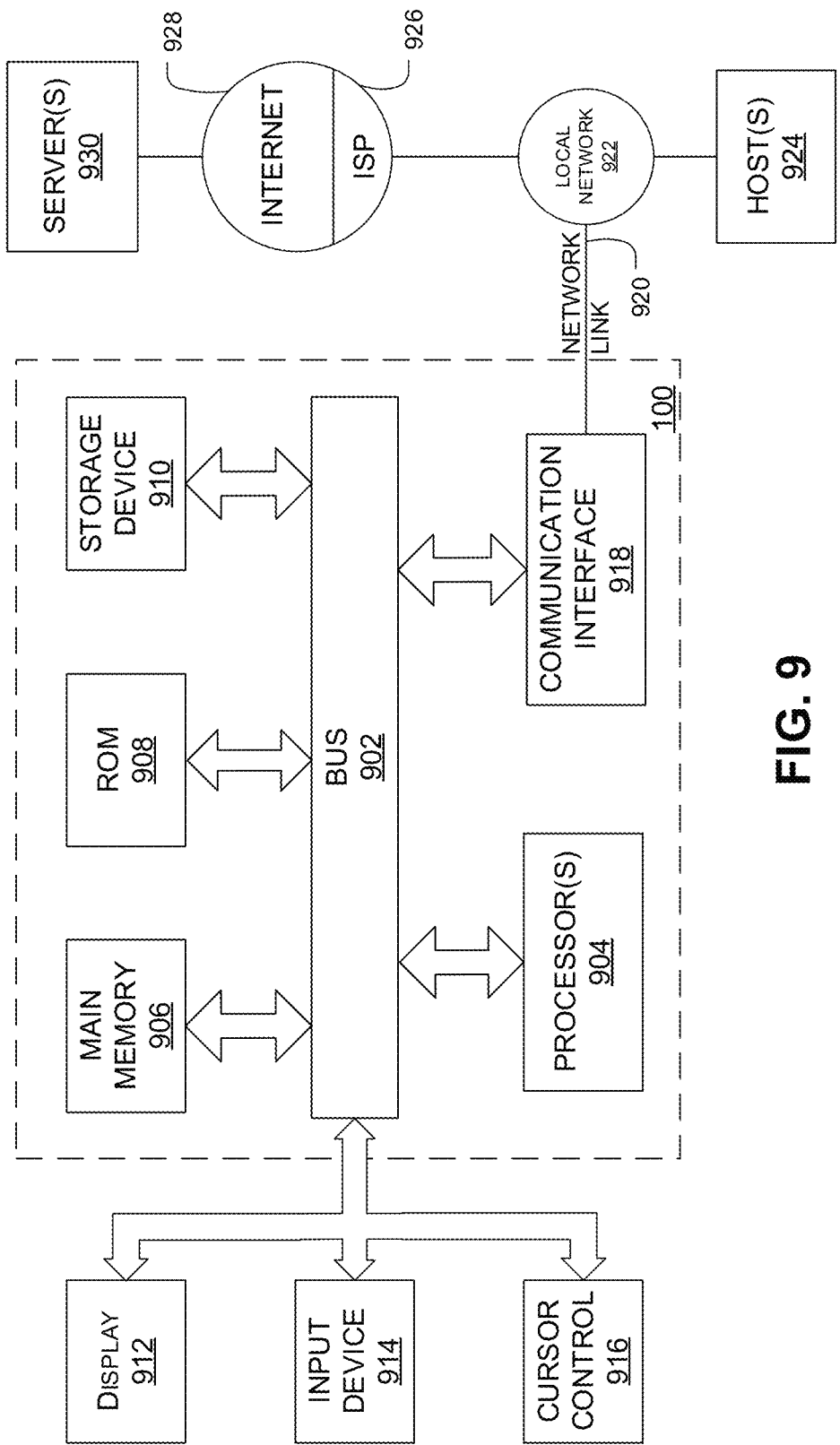
FIG. 9 is a block diagram illustrating an example distributed database system with which various methods and systems discussed herein may be implemented.

FIG. 9 is a block diagram that illustrates example components of the distributed database system 100. While FIG. 9 refers to the distributed database system 100, any of the other computing devices, modules, services, and/or user computing devices discussed herein may have some or all of the same or similar components.

The distributed database system 100 may execute software, e.g., standalone software applications, applications within browsers, network applications, etc., whether by the particular application, the operating system, or otherwise. Any of the systems discussed herein may be performed by the distributed database system 100 and/or a similar computing system having some or all of the components discussed with reference to FIG. 9.

The distributed database system 100 includes a bus 902 or other communication mechanism for communicating information, and a hardware processor, or multiple processors, 904 coupled with bus 902 for processing information.

The distributed database system 100 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render the distributed database system 100 into a special-purpose machine that is customized to perform the operations specified in the instructions. Such instructions, as executed by hardware processors, may implement the methods and systems described herein for generating and/or executing efficient queries.

The distributed database system 100 further includes a read only memory (ROM) 908 or other static storage device coupled to bus 902 for storing static information and instructions for processor(s) 904. A storage device 910, such as a magnetic disk, optical disk, or flash drive, etc., is provided and coupled to bus 902 for storing information and instructions. The timestamp service 104, the transaction service 106, the cleanup service 108, and/or the backup service 112 of FIG. 1 may be stored on the main memory 906 and/or the storage device 910.

The distributed database system 100 and/or external computing device 102 may be coupled via bus 902 to a display 912, such as a LCD display or touch screen, for displaying information to a computer user. An input device 914 is coupled to bus 902 for communicating information and command selections to processor 904. One type of input device 914 is a keyboard including alphanumeric and other keys. Another type of input device 914 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The distributed database system 100, or components of it, such as the timestamp service 104, the transaction service 106, the cleanup service 108, and/or the backup service 112 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Bus 902 carries data to main memory 906, from which the processor(s) 904 retrieves and executes the instructions. The instructions received by main memory 906 may retrieve and execute the instructions. The instructions received by main memory 906 may optionally be stored on storage device 910 either before or after execution by computer hardware processor(s) 904.

The distributed database system 100 also includes a communication interface 918 coupled to bus 902. Communication interface 918 provides a two-way data communication coupling to a network link 920 that is connected to a local network 922. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from the distributed database system 100, are example forms of transmission media.

A network, such as the network 160 of FIG. 1, may comprise, but is not limited to, one or more local area networks, wide area network, wireless local area network, wireless wide area network, the Internet, or any combination thereof.

The distributed database system 100 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

In some embodiments, the distributed database system 100 and/or the external computing device 102 may operate in a distributed computing environment including several computer systems that are interconnected using one or more computer networks. The distributed database system 100 and/or the external computing device 102 could also operate within a computing environment having a fewer or greater number of devices than are illustrated in FIG. 1 and/or FIG. 9. Thus, the depiction of distributed database system 100 and/or the external computing device 102 in FIG. 1 and/or FIG. 9 should be taken as illustrative and not limiting to the present disclosure. For example, the distributed database system 100 and/or the external computing device 102 could implement various Web services components and/or peer-to-peer network configurations to implement at least a portion of the processes described herein. For example, multiple servers and/or processes may process and/or analyze items and/or present a user interface in a distributed manner, as described herein.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A database system comprising:
   one or more computer hardware processors configured to execute computer-executable instructions to cause the database system to at least:
   pause a cleanup process on a plurality of nodes of a database cluster;
   initiate a hold on issuing one or more new timestamps to one or more external computing devices;
   generate a backup timestamp;
   generate a duplicate copy of data from the plurality of nodes; and
   store, in a backup data store, the duplicate copy of data and the backup timestamp.

2. The database system of claim 1, wherein the one or more computer hardware processors are further configured to execute the computer-executable instructions to cause the database system to at least:
   receive a request to restore one or more key-value tables on the plurality of nodes;
   load the duplicate copy of data on a first node of the plurality of nodes; and
   delete a first entry from the first node with a first timestamp more recent than the backup timestamp.

3. The database system of claim 2, wherein to store the duplicate copy of data, the one or more computer hardware processors are further configured to execute the computer-executable instructions to cause the database system to at least:
   determine that a first portion of the duplicate copy of data changed from a previous duplicate copy of data; and
   store, in the backup data store, the first portion of the duplicate copy of data that changed.

4. The database system of claim 3, wherein to store the duplicate copy of data, the one or more computer hardware processors are further configured to execute the computer-executable instructions to cause the database system to at least:
   determine that a second portion of the duplicate copy of data remained unchanged from the previous duplicate copy of data; and
   store, in the backup data store, metadata associated with the second portion, the metadata indicating that the second portion remained unchanged.

5. The database system of claim 3, wherein to determine that the first portion changed, the one or more computer hardware processors are further configured to execute the computer-executable instructions to cause the database system to at least:
   generate a first hash value from the first portion;
   generate a second hash value from a portion of the previous duplicate copy of data corresponding to the first portion; and
   determine that the first hash value is different than the second hash value.

6. The database system of claim 1, wherein the duplicate copy of data comprises a portion of data from the plurality of nodes.

7. The database system of claim 6, wherein the portion of data comprises data that has changed since a last backup.

8. A method comprising:
   pausing a cleanup process on a plurality of nodes of a database cluster;
   initiating a hold on allowing writes from committing to the database cluster;
   generating a backup timestamp;
   generating a duplicate copy of data from the plurality of nodes; and
   storing, in a backup data store, the duplicate copy of data and the backup timestamp,
   wherein the method is performed by one or more computer hardware processors.

9. The method of claim 8 further comprising:
   receiving a request to restore one or more key-value tables on the plurality of nodes;
   loading the duplicate copy of data on a first node of the plurality of nodes; and
   deleting a first entry from the first node with a first timestamp more recent than the backup timestamp.

10. The method of claim 9, wherein the first timestamp comprises a first numerical value, the backup timestamp comprises a second numerical value, the method further comprising:
    determining that the first timestamp is more recent than the backup timestamp, wherein determining that the first timestamp is more recent further comprises:
    determining that the first numerical value is greater than the second numerical value.

11. The method of claim 8, wherein the backup timestamp comprises a logical clock value, and wherein generating the backup timestamp further comprises incrementing a current logical clock value.

12. The method of claim 8 further comprising:
receiving a request to insert a key-value entry into a first key-value table on the plurality of nodes;
generating a new timestamp; and
inserting the key-value entry into the first key-value table with the new timestamp.

13. The method of claim 12, wherein the new timestamp comprises a logical clock value, and wherein generating the new timestamp further comprises incrementing a current logical clock value.

14. The method of claim 8 further comprising:
receiving, from a first external computing device, a request for a new timestamp during the hold; and
postponing responding to the request until the hold is removed.

* * * * *